US010356465B2

(12) United States Patent
Shintani et al.

(10) Patent No.: US 10,356,465 B2
(45) Date of Patent: Jul. 16, 2019

(54) VIDEO SYSTEM DEMONSTRATION

(75) Inventors: Peter Rae Shintani, San Diego, CA (US); Brant L. Candelore, San Diego, CA (US)

(73) Assignees: Sony Corporation, Tokyo (JP); SONY ELECTRONICS INC., Park Ridge, NJ (US)

( * ) Notice: Subject to any disclaimer, the term of this patent is extended or adjusted under 35 U.S.C. 154(b) by 1225 days.

(21) Appl. No.: 12/655,723

(22) Filed: Jan. 6, 2010

(65) Prior Publication Data

US 2011/0164143 A1    Jul. 7, 2011

(51) Int. Cl.
*H04N 21/442* (2011.01)
*H04N 21/4223* (2011.01)

(52) U.S. Cl.
CPC ... *H04N 21/4223* (2013.01); *H04N 21/44218* (2013.01)

(58) Field of Classification Search
USPC ............... 705/14.42, 2, 14.4; 345/156, 173; 348/569, 216.1; 382/118; 725/10; 715/863
See application file for complete search history.

(56) References Cited

U.S. PATENT DOCUMENTS

| 6,075,551 A | 6/2000 | Berezowski et al. |
| 6,226,533 B1 | 5/2001 | Akahane |
| 6,518,998 B1* | 2/2003 | Christoff ............. H04N 5/2352 348/216.1 |
| 6,704,671 B1 | 3/2004 | Umminger, III |
| 7,500,758 B1* | 3/2009 | Adachi et al. ................ 353/101 |
| 2002/0075243 A1* | 6/2002 | Newton ............... G06F 3/0421 345/173 |
| 2002/0085023 A1 | 7/2002 | Zustak et al. |
| 2002/0087402 A1 | 7/2002 | Zustak et al. |
| 2002/0169970 A1 | 11/2002 | Candelore |
| 2002/0194593 A1 | 12/2002 | Tsuchida et al. |
| 2003/0208469 A1 | 11/2003 | Stern |
| 2005/0132420 A1 | 6/2005 | Howard et al. |
| 2005/0172319 A1 | 8/2005 | Reichardt et al. |
| 2005/0197923 A1* | 9/2005 | Kilner ............... G06K 9/00221 382/118 |

(Continued)

FOREIGN PATENT DOCUMENTS

WO    WO-2006117942 A1 * 11/2006 ............. G03B 17/53

OTHER PUBLICATIONS

Online Advertising: Defining Relevant Markets1 (James D. Ratliff and Daniel L. Rubinfeld) (Year: 2002).*

(Continued)

*Primary Examiner* — Tarek Elchanti
(74) *Attorney, Agent, or Firm* — John L. Rogitz

(57) ABSTRACT

A television demonstration method involves providing a television display and a camera; at a computer processor, receiving a video image from the camera, the computer processor capturing the video image from the camera to determine if the viewer makes a predetermined gesture; and retrieving and playing a specified video segment on the display associated with the gesture in response to determining that the viewer has made the predetermined gesture. This abstract is not to be considered limiting, since other embodiments may deviate from the features described in this abstract.

13 Claims, 5 Drawing Sheets

(56) References Cited

U.S. PATENT DOCUMENTS

| | | | |
|---|---|---|---|
| 2006/0143647 A1* | 6/2006 | Bill | G06F 17/30743 725/10 |
| 2006/0168616 A1* | 7/2006 | Candelore | 725/34 |
| 2008/0037841 A1* | 2/2008 | Ogawa | H04N 5/232 382/118 |
| 2008/0147488 A1 | 6/2008 | Tunick et al. | |
| 2008/0309796 A1* | 12/2008 | Abe | 348/231.99 |
| 2009/0077504 A1* | 3/2009 | Bell et al. | 715/863 |
| 2009/0112617 A1* | 4/2009 | Jung | G06F 19/3418 705/2 |
| 2009/0132275 A1 | 5/2009 | Jung et al. | |
| 2009/0153736 A1* | 6/2009 | Mortensen | H04N 5/44513 348/569 |
| 2009/0158314 A1* | 6/2009 | Flynn | 725/32 |
| 2010/0207874 A1* | 8/2010 | Yuxin | G06F 3/017 345/156 |
| 2010/0222046 A1 | 9/2010 | Cumming | |
| 2010/0268594 A1* | 10/2010 | Tung | G06Q 30/02 705/14.42 |
| 2010/0271390 A1* | 10/2010 | Tran et al. | 345/619 |
| 2011/0029875 A1 | 2/2011 | Milch | |
| 2011/0149159 A1 | 6/2011 | Candelore et al. | |
| 2011/0149160 A1 | 6/2011 | Shintani et al. | |
| 2013/0097565 A1* | 4/2013 | Freeding | G09B 7/02 715/863 |

OTHER PUBLICATIONS

Sherwood, "Clap-Controlled TV Consigns Remote to Bin of History," URL: http://www.reghardware.co.uk/2007/10/08/jvc_clap_tv/, Oct. 8, 2007.

U.S. Appl. No. 12/643,669, Non-Final Office Action dated Apr. 24, 2012.

U.S. Appl. No. 12/643,746, Non-Final Office Action dated Jun. 19, 2012.

U.S. Appl. No. 12/643,669, Final Office Action dated Nov. 8, 2012.

Burlamaqui, et al., "Indirect Group Interaction in Inerpeceptives Virtual Environments," (Abstract Only), Virtual Environments, Human-Computer Interfaces and Measurement Systems, VECIMS 2008, IEEE, pp. 92-96, Jul. 14-16, 2008.

* cited by examiner

VIDEO SYSTEM DEMONSTRATION

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

In many television (TV) markets there are many knowledgeable retailers often staffed by manufacturer's paid staff or other knowledgeable sales personnel. Customers can comparison shop with facts that obtained at the store with the assistance of such knowledgeable staff. In such environments, the customer is usually able to interact with the TV that they considering. Some TVs incorporate a demo mode which may be helpful in assisting a sales person or consumer in learning about the features of a particular TV.

Tethered remote controls are sometimes made available to check out all of a TV's features. But, unfortunately, TVs are often left by customers in various modes of operation that are not beneficial to sales, and store personnel has to be vigilant to put the TV back in a suitable mode, otherwise the presentation of the TV may be less attractive to a potential buyer.

In some retail outlets, TVs are sold through non-assisted or partially assisted retail environments. At these sites, the customer may not be able to interact with many, if not all, of the TVs on display. In such environments, often every TV is tuned to an in-store channel and the content may not show-off any particular TV's features. In fact, the content is often literally a series of advertisements for shows (for which the retail outlet may be compensated), program channels and captive brand products. Any description of TV technology may be by virtue of paid ads that a TV manufacturer or marketer places on the ad channel. In view of such revenue generation by the retailer, special demos that pre-empt a store's standard demo arrangement may require special consideration and placement on an end cap which in turn may be a product location that is either not available or available only for a premium price or other consideration from the vendor to the store. Hence, in such markets it is difficult for a manufacturer to showcase its product advantages over the competition and difficult for a consumer to make an informed decision regarding purchase.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 2:
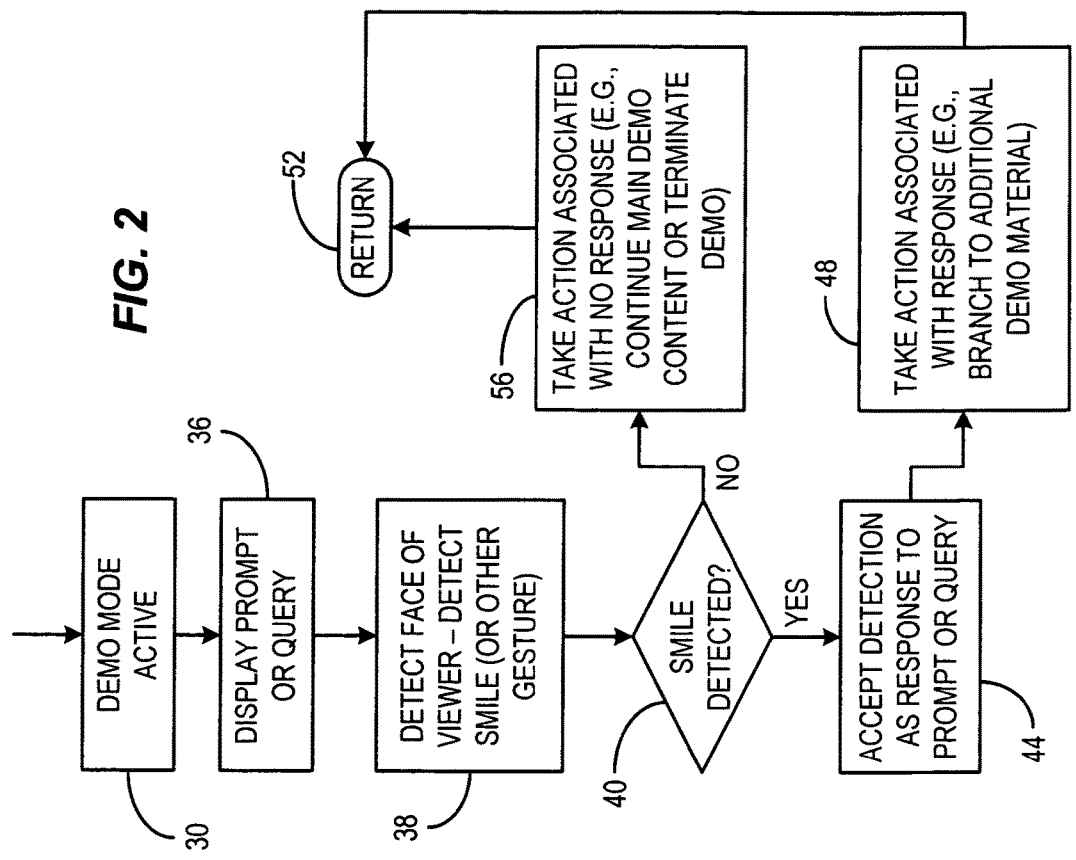
FIG. 2 is a flow chart of an example of a process consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality"; as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A "gesture" is defined herein to mean bodily poses or movements including facial expressions such as a smile, frown, etc.

In accord with certain embodiments consistent with the present invention, a TV can be equipped with a camera so that the camera to be used in a retail environment in order to trigger a demo of the TV on-demand. In other embodiments, the camera can be used to trigger other video playback that can be useful in demonstrating a television set or attracting potential buyers to the TV. The camera can further be used to control branching operations in the demonstration to access more detailed demonstration or feature descriptions.

The camera can be used for triggering a demo, which can be made to be very interactive with the potential customer in a retail setting and can be a fun way for a user to interact with a TV in a manner that avoids problems associated with giving the user full access to a TV's controls. In certain implementations, the camera and associated circuitry is able to distinguish not only faces but smiles on peoples' faces or other gestures that can be used to access demo content or indicate decisions. One reason for using a "smile" to trigger a demo is that the customer may be in a better state of mind, while smiling before a demo is activated, but the use of a smile is not to be considered limiting. While the camera is trying to detect the smile of the customer, the video output of the camera can be displayed on the TV screen, so the customer will have some immediate feedback, and while also be entertained. The video quality can also be demonstrated.

Figure 1:
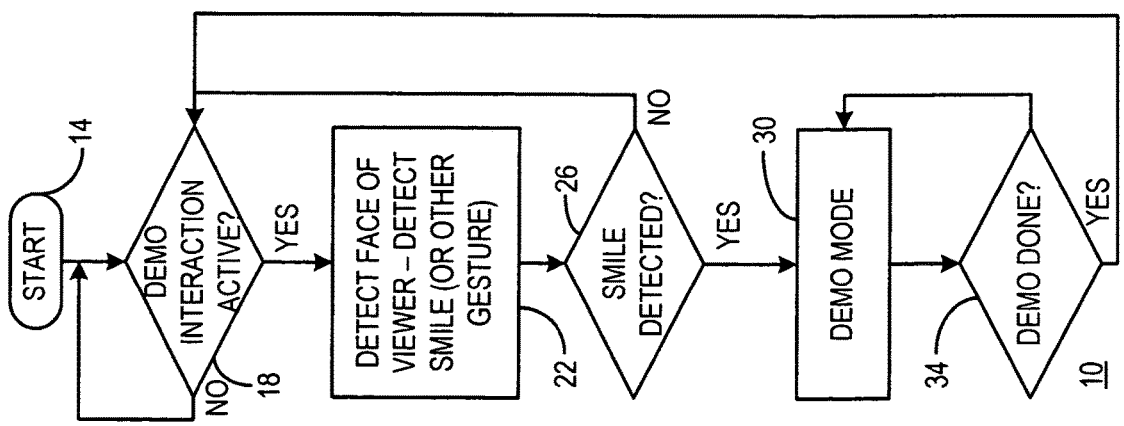
FIG. 1 is a flow chart of an example demonstration process consistent with certain embodiments of the present invention.

Turning now to FIG. 1, an example of an implementation of a method consistent with the present invention is depicted in flow chart 10, starting at 14. If the TV has been set in a demonstration interactive mode wherein the system is awaiting a customer's appropriate gesture to enable the demo at 18, then the system's camera looks for the appropriate gesture. A suitable and readily implemented gesture is a smile. Currently available cameras are equipped with software, hardware or firmware that can detect faces and smiles to aid in focus and timing of a photograph, and similar technology can be applied here. In the case of detection of a smile, the face is detected at 22 and analyzed for the presence of a smile. If a smile is detected at 26, then the TV can enter a demonstration mode at 30 which pre-empts other video inputs. Hence, at the prompting or spontaneous occurrence of the pre-determined gesture, the TV enters the demo mode at 30 and a demo can play to completion at 34 without need for the user to interact using a remote controller or other device that could leave the TV in an undesirable mode of operation. Once the demo is completed, in this implementation, the process can return to await the next occurrence of the specified gesture.

In preferred implementations, as will be depicted later, the system can provide a prompt or query to the user via the TV display (or signage). For example, a video overlay can display or flash a prompt message such as "Smile if you would like to see a demonstration of this TV", or "Smile to find out about contrast ratio", etc. The message can either be constant, appear at timed or random intervals or can be prompted by detection of a face (possibly suggesting some level of interest in the TV already). At the urging of a TV to smile, a potential customer is likely to smile, just to try it out and will then be engaged in learning about the product. Moreover, since interruptions in commercial programming used for display content in retailers is minimally disrupted and disrupted only on demand making it less likely that the retailer or advertisers would object to use of the technique.

It is noted that while smile detection is used as an example herein, it is merely considered a convenient example and is not to be considered limiting since other gestures such as hand waving, frowns, sticking out of tongues or the like could also be used to evoke play of associated video content.

FIG. 2 depicts an example of an embodiment wherein once the demo mode is active at 30 (meaning that a demonstration is in progress via display of video content used in the demo). In one example, a basic demo might include video content that highlights the performance of the TV along with text (and possibly audio) that will explain basic features that are associated with the TV. But, during the course of the demo, it may be desired to permit the user to select features that he or she desires further information about. For example, during the demo 30, the demo can pause for a user input in the form of a gesture representing a "yes" answer or selection of a gesture from a menu of gestures to select more information. In this example, the display could display a prompt that says "Smile for more information about IPTV" or "Wave your hand for more information about HDTV resolution numbers", or "Smile to see a demo of TV widgets" or the like at 36 (or a menu of gestures and associated content). Using the face/smile detection example at 38, if the user smiles at the camera at 38 and a smile is detected at 40, the system can accept that as an input that indicates that the user is responding positively to the query or prompt at 44. The system can then take an action at 48 associated with the response so as to create a branching in the operation. In this case, a branching in the operation simply leads to play of a specified video relating to the topic of the query or prompt or menu. No detection of a smile or other gesture at 40 after a period of time or during display of the prompt can similarly be taken as a negative response to the query or prompt or menu and an appropriate action taken (if any at 56). In either case the process can return at 52 either to the main demo at this point or the demo can terminate resulting in resumption of play of the normal content displayed at the particular retail location (e.g., and advertising channel).

Figure 3:
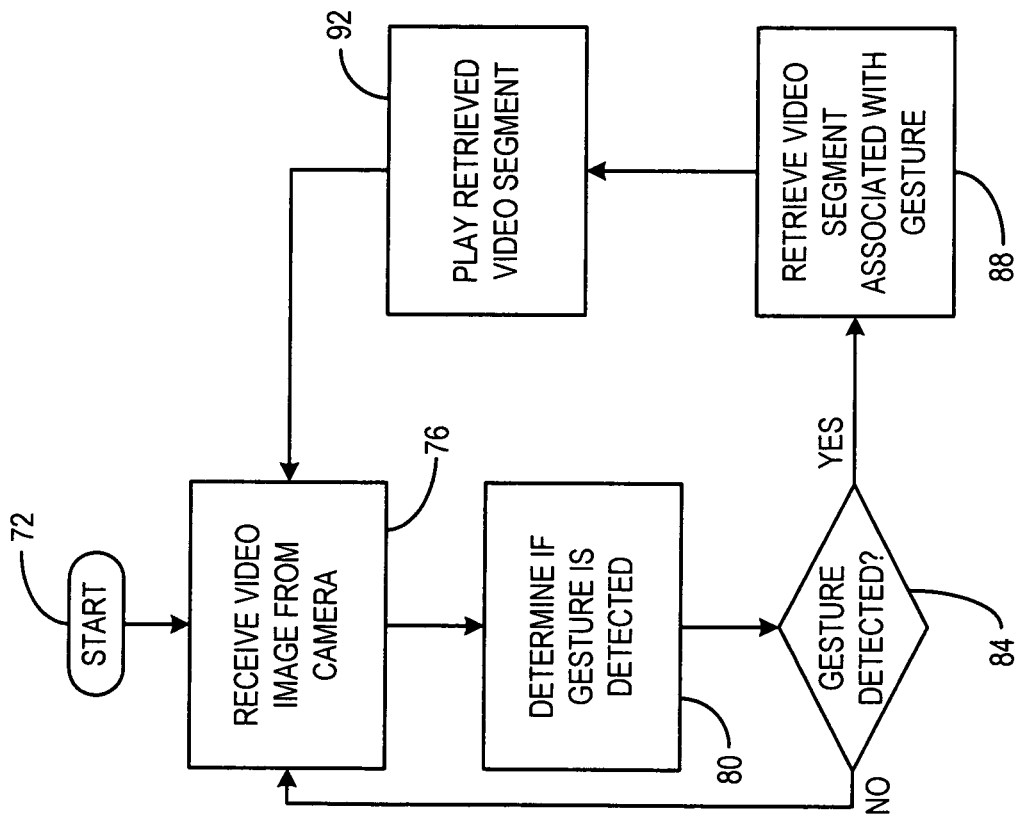
FIG. 3 is a flow chart of an example of a process consistent with certain embodiments of the present invention.

In another example implementation depicted in FIG. 3, the system can simply look for one or more gestures made by customers and match that gesture to a video segment. In this manner, for example, if the face of a crying child is detected, the video can be changed to an amusing video of children's content (e.g., cartoons, clowns, etc.). The process 70 of FIG. 3 starts at 72 after which the video is received from the video camera at 76 and on an ongoing basis the system determines if a gesture from one or more known gestures is detected at 80. If a gesture is detected at 84, a video segment associated with the gesture (for example, in a database) is retrieved at 88 and played on the TV display at 92. Hence, the TV display can react to common gestures that suggest an associated action in order to attract attention to the TV and stimulate sales.

Figure 4:
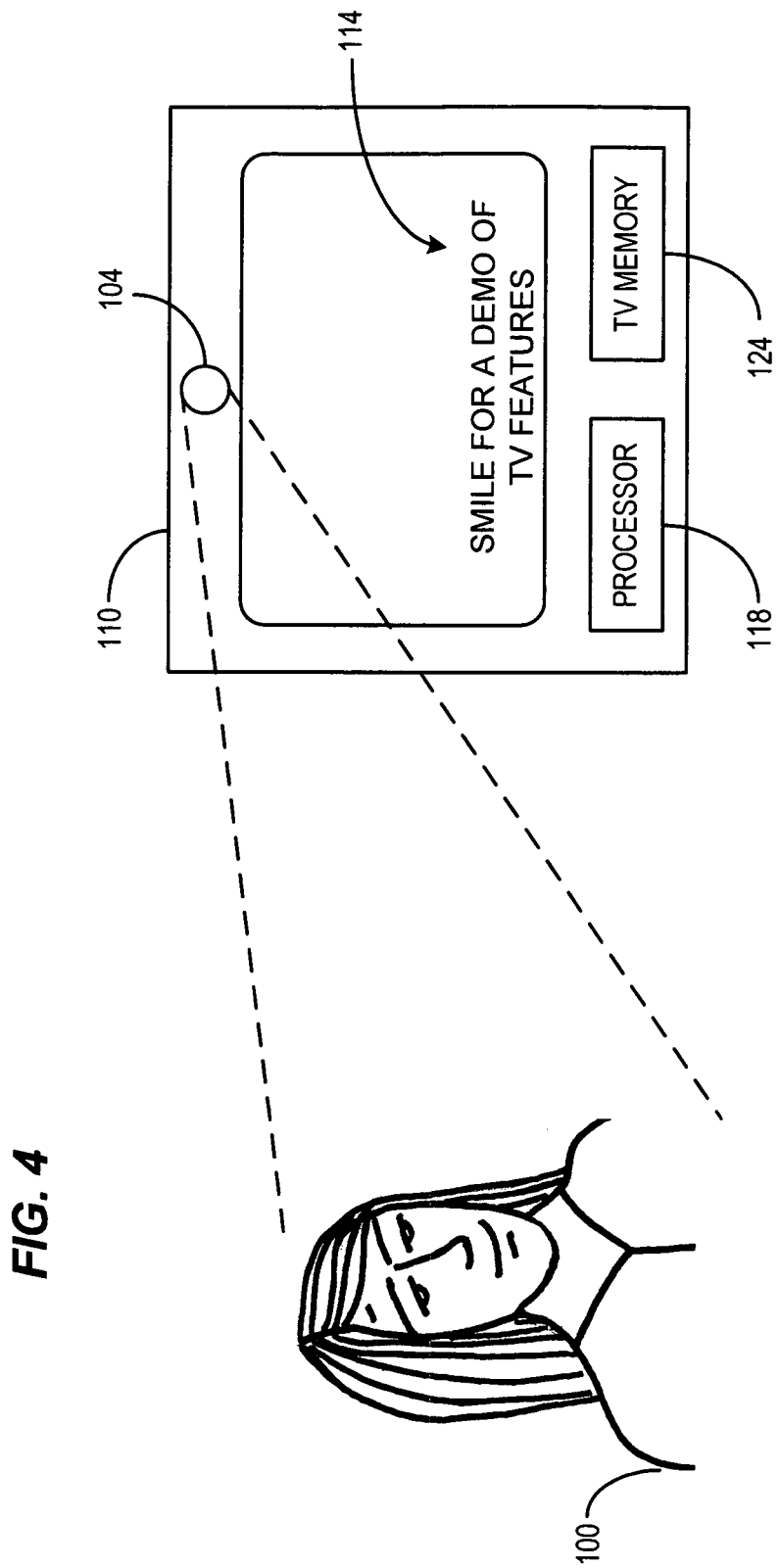
FIG. 4 is an illustration of an example demonstration process consistent with certain embodiments of the present invention.

FIG. 4 depicts an example system in which a potential customer 100 is imaged by a camera 104 that is integral to a TV set 110. The TV displays the message 114 "Smile for a demo of TV features" on its display. If the potential customer 100 smiles and the camera and demo system, in this case a programmed processor 118 operating in conjunction with the TV memory 124, the system operates as previously described and begins play of the demo either from internal memory or a designated an external source.

Figure 5:
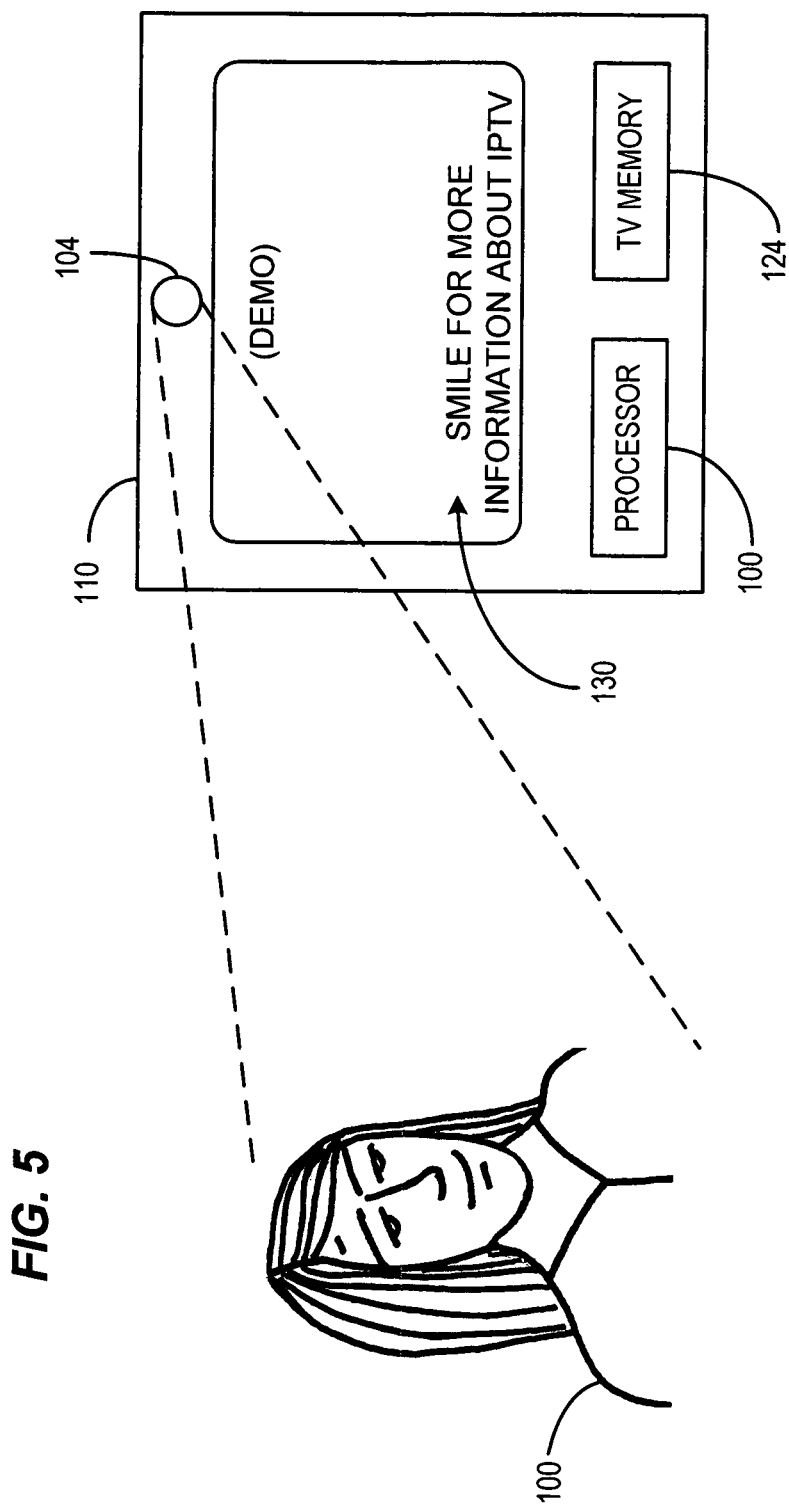
FIG. 5 is an example illustration of an internal demonstration system consistent with certain embodiments of the present invention.

Similarly, in FIG. 5, the demo is already running (as indicated by the parenthetical "DEMO" shown on the TV display) and the demonstration provides a prompt for further user direction for branching. In this example, the prompt 130 is "Smile for more information about IPTV", but any feature could be emphasized depending on marketing or other considerations. Upon detection of a smile (for example) the user provides an affirmative answer to the query and proceeds to retrieve a suitable segment of video corresponding to the positive response.

Figure 6:
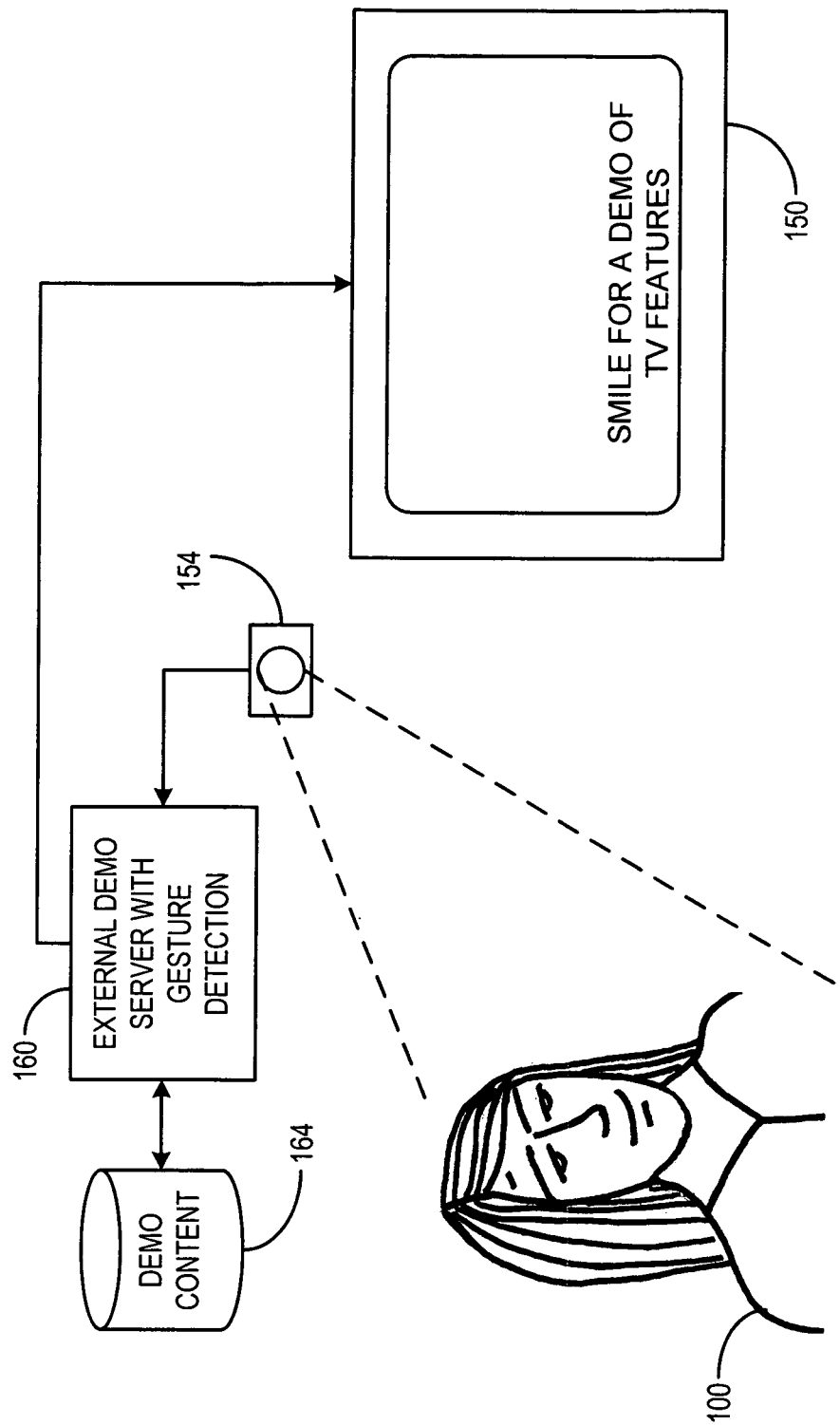
FIG. 6 is an example illustration of an external demonstration system consistent with certain embodiments of the present invention.

FIG. 6 depicts an alternative embodiment that is especially appropriate for lower cost TV set demonstration in which the TV 150 is not equipped with a camera and/or perhaps not equipped with enough processing power or memory to carry out the above-described demo mode, or where it is otherwise desirable to separate the demo system from the TV. In this case, a separate camera 154 that is external to the TV can be used to capture the information associated with a potential customer's gestures. This camera's output is processed by an external demonstration server 160 that feeds demonstration content to the TV 150. As in all cases described, the output of the camera can also be fed to the display either as a full display, picture in picture window, etc. at any desired time and especially when the system is looking for a gesture. Once an appropriate gesture is made, demo content can be retrieved from storage 164 and streamed to the TV 150.

Many variations will occur to those skilled in the art upon consideration of the present teachings. In any event, the use of detection of a potential customer's gestures can be used as a trigger to begin execution of a process which displays a selected segment of video for the viewer, either as standalone content or as a branch from another selected segment of video.

Thus, in certain implementations, a television having demonstration capabilities has a television display and a camera. A computer processor receives a video image from the camera and having face detection and smile detection programming. The processor causes an image to be displayed on the display in order to prompt a viewer to smile. The computer processor captures the video image from the camera to determine if the viewer responds to the prompt by detecting the user's face and detecting a smile on the user's face. The computer processor retrieves and plays a demonstration video segment on the display responsive to determining that the viewer has responded to the prompt by smiling.

In certain implementations, receiving the demonstration video segment initiates operation of the television in a demonstration mode. In certain implementations, retrieving the demonstration video segment branches an existing demonstration to demonstrate a feature specified by the prompt. In certain implementations, the video image from the camera is displayed on the video display.

Another example implementation of a television demonstration system has a television display and a camera. A computer processor receives a video image from the camera. The processor causes an image to be displayed on the display in order to prompt a viewer to make a gesture. The computer processor captures the video image from the camera to determine if the viewer responds to the prompt by making the gesture. The computer processor retrieves and plays a demonstration video segment on the display responsive to determining that the viewer has responded to the prompt by making the gesture.

In certain implementations, the gesture comprises a facial gesture. In certain implementations, the facial gesture comprises a smile. In certain implementations, retrieving the demonstration video segment initiates operation of the television in a demonstration mode. In certain implementations, retrieving the demonstration video segment branches an existing demonstration to demonstrate a feature specified by the prompt. In certain implementations, the processor has face detection and facial expression detection programming. In certain implementations, the video image from the camera is displayed on the video display. In certain implementations, the camera and computer processor are integral to the television.

Another example television demonstration system has a television display and a camera. A computer processor receives a video image from the camera. The computer processor captures the video image from the camera to determine if the viewer makes a predetermined gesture. The computer processor retrieves and plays a specified video segment on the display associated with the gesture in response to determining that the viewer has made the predetermined gesture.

In certain implementations, the gesture is a facial gesture. In certain implementations, retrieving the specified video segment initiates operation of the television in a demonstration mode. In certain implementations, retrieving the specified video segment causes a branching operation in an existing demonstration to demonstrate a specified television feature. In certain implementations, the processor has face detection and facial expression detection programming. In certain implementations, the video image from the camera is displayed on the video display. In certain implementations, the camera and computer processor are integral to the television.

An example television demonstration method involves providing a television display and a camera; at a computer processor, receiving a video image from the camera, the computer processor capturing the video image from the camera to determine if the viewer makes a predetermined gesture; and retrieving and playing a specified video segment on the display associated with the gesture in response to determining that the viewer has made the predetermined gesture.

In certain implementations, the gesture comprises a facial gesture. In certain implementations, the process further involves retrieving the specified video segment initiates operation of the television in a demonstration mode. In certain implementations, retrieving the specified video segment branches an existing demonstration to demonstrate a specified television feature. In certain implementations, the processor has face detection and facial expression detection programming. In certain implementations, the video image from the camera is also displayed on the video display. In certain implementations, the camera and computer processor are integral to the television.

A tangible computer readable electronic storage medium can store instructions which, when executed on one or more programmed processors, can carry out any of the methods described herein.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A video display system having demonstration capabilities, comprising:
    at least one computer processor configured for receiving a video image from a camera;
    the computer processor having face detection and smile detection programming;
    the at least one computer processor configured to access a computer memory; and
    the computer memory, comprising instructions executable by the computer processor for: causing an image to be displayed on a display for a potential customer viewing the display;
    the displayed image caused by the computer processor on the display including a prompt that instructs the potential customer to a smile if the potential customer wishes to obtain a demonstration relating to a specific feature relating to the video display, the specific feature being specified in the prompt;
    capturing the video image from the camera that contains an image of the potential customer's face;
    determining if the image of the potential customer's face includes the smile;
    responsive to a determination that the potential customer's face includes the smile, retrieving and playing a demonstration video segment on the display as a response to determining that the potential customer has responded to the prompt by smiling; and
    responsive to a determination that the potential customer's face includes a gesture other than the smile, not retrieving and playing the demonstration video segment on the display as a response to determining that the potential customer returning the gesture other than the smile.

2. The video display system according to claim 1, where retrieving the demonstration video segment initiates operation of the video display system in a demonstration mode.

3. The video display system according to claim 1, where retrieving the demonstration video segment branches an existing demonstration to demonstrate a feature specified by the prompt.

4. The video display system according to claim 1, where the video image from the camera is displayed on the display.

5. A video demonstration system, comprising:
    at least one computer processor receiving a video image from a camera;
    the computer processor configured with executable instructions for causing an image to be displayed on a display for a potential customer viewing the display;
    the computer processor configured with executable instructions for capturing the video image from the camera that contains an image of the potential customer;
    the computer processor configured with executable instructions for determining, responsive to being in an interactive demonstration mode, whether the image of the potential customer indicates a gesture satisfying a match criteria with a demonstration gesture;
    the computer processor configured with executable instructions for, responsive to a determination that the image of the potential customer indicates the gesture satisfying a match criteria with the demonstration gesture;
    playing a demonstration video; and
    the computer processor configured with executable instructions for not determining, responsive to not being in an interactive demonstration mode, whether the image of the potential customer indicates the gesture satisfying a match criteria with the demonstration gesture.

6. A demonstration method, comprising:
    providing a video display and a camera;
    receiving a video image from the camera;
    capturing the video image from the camera,
    causing the display to display an image that includes a prompt to a potential customer;
    determining whether or not a potential customer makes a predetermined gesture;
    where the prompt asks the potential customer to make the gesture in response to the prompt in the event the potential customer wishes to see a specified video segment demonstrating operation of a function of the television; and retrieving and playing the specified video segment on the display associated with the gesture in response to determining that the viewer has made the predetermined gesture.

7. The method according to claim 6, where the gesture comprises a facial gesture.

8. The method according to claim 7, where retrieving the specified video segment initiates operation in a demonstration mode.

9. The method according to claim 7, where retrieving the specified video segment branches an existing demonstration to demonstrate a specified television feature.

10. The method according to claim 7, where the processor has face detection and facial expression detection programming.

11. The method according to claim 7, further comprising displaying the video image from the camera on the display.

12. The method according to claim 7, where the camera and computer processor are integral to a television.

13. A computer memory that is not a transitory signal and that comprises instructions executable by one or more programmed processors for:

causing an image to be displayed on a video display, where display of the image on the display provides a prompt for a potential customer that instructs the potential customer to make a predetermined gesture if the potential customer wishes to obtain a demonstration relating to the video display;

receiving a video image from a camera;

capturing the video image from the camera to determine if the potential customer makes the predetermined gesture;

determining whether or not the potential customer makes the predetermined gesture; and retrieving and playing a specified video segment on the display associated with the predetermined gesture in response to determining that the viewer has made the predetermined gesture.

* * * * *